Feb. 7, 1961 F. UNGERER 2,970,691
PLANT FOR SORTING STRIPS OF MATERIAL DIFFERING
FROM ONE OR MORE REFERENCE CHARACTERISTICS
Filed July 21, 1954 2 Sheets-Sheet 1
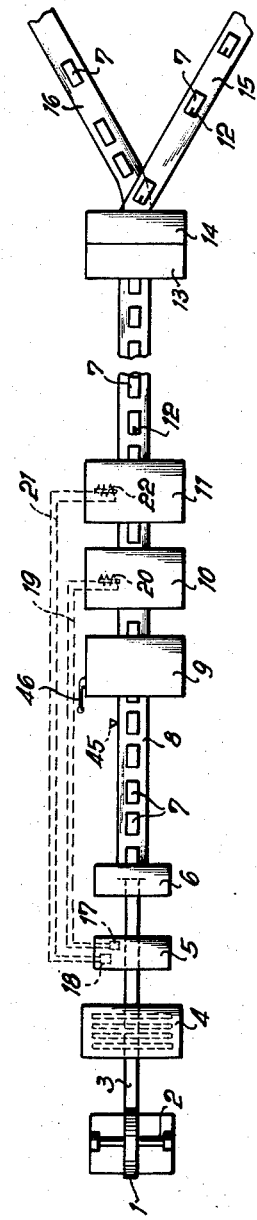
INVENTOR
FRITZ UNGERER Feb. 7, 1961 F. UNGERER 2,970,691
PLANT FOR SORTING STRIPS OF MATERIAL DIFFERING
FROM ONE OR MORE REFERENCE CHARACTERISTICS
Filed July 21, 1954
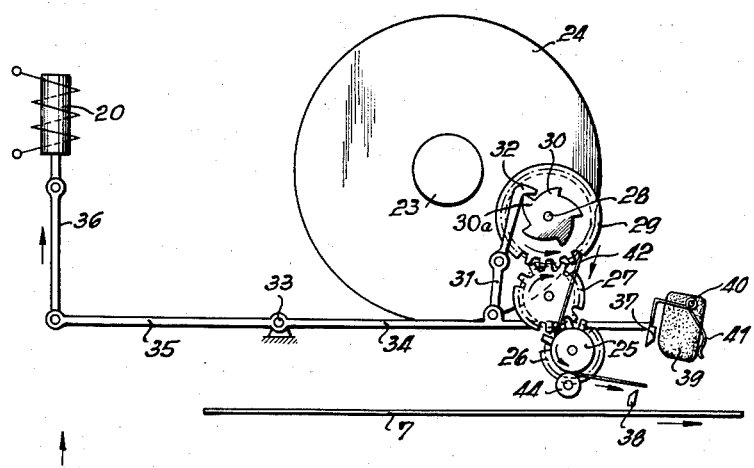
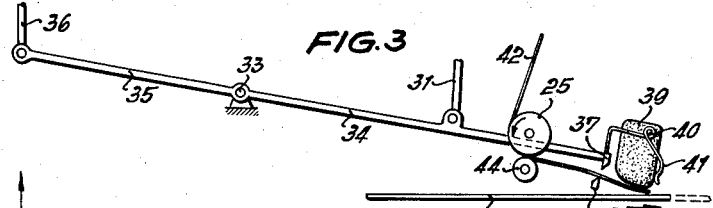
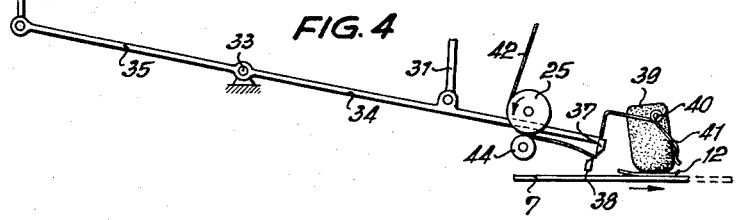
INVENTOR
FRITZ UNGERER United States Patent Office 2,970,691
Patented Feb. 7, 1961

2,970,691

PLANT FOR SORTING STRIPS OF MATERIAL DIFFERING FROM ONE OR MORE REFERENCE CHARACTERISTICS

Fritz Ungerer, Pforzheim-Brotzingen, Germany

Filed July 21, 1954, Ser. No. 444,857

Claims priority, application Germany May 12, 1954

4 Claims. (Cl. 209—82)

This invention relates to an apparatus with sorting mechanism for pieces of strip material, in particular sheet metal strips moved in succession along a predetermined course.

In known arrangements of this type an operator was required to observe dials of testing devices and also sheet metal strips themselves in order to be able to detect faulty strips or work pieces of this character and to remove a respective defective or faulty strip by releasing a device causing deviation of the respective faulty strip from its regular course along which strips complying with the requirements of first quality are conveyed.

In contra-distinction to these known arrangements, the present invention contemplates the provision of means ensuring a highly economical and rapidly operating sorting plant for guiding metallic or like strips to at least one testing device, then to at least one marking device controlled by said testing device and actuatable to indicate a faulty strip among said strips, and finally to a further device responsive to the strip markings to sort out undesirable or faulty metal strip or strips.

The advantages of such plant reside in that any faulty or undesirable metal strips are automatically sorted out, so that the output of such plant may be readily adjusted to the economy and output of strip cutting or producing machines of any desired dimension and that the faulty metal strips are so indicated by respective markings that each strip even when it is removed from a stack of faulty strips, will immediately and even later on be recognized to belong to a particular type of faulty or waste metal strips.

The plant according to the invention may include one or more testing devices for measuring or testing dimensions and/or important properties of the material of which the sheet metal pieces or strips consist.

According to a preferred embodiment of the invention the device for marking faulty sheet metal strips may be constructed so that each faulty sheet metal strip is marked independently of its respective defect with one and the same marking.

According to another embodiment of the invention, several marking devices may be provided, which are coordinated to each testing device or groups of testing devices, and wherein the several respective marking devices are so constructed that they are enabled to provide different markings in accordance with the categories of defects detected with respect to the respective sheet metal strips. The adavantage of such latter structure resides in the fact that the respective faulty sheet metal stirps are marked to designate corresponding defects after detection and also in various manners, so that faulty sheet metal strips may be separated and sorted out by initiating special sorting devices in accordance with various categories of defects. Even, if after the defects have been determined and sorting out of the faulty strips does not immediately take place during the ensuing operational conditions, such defective pieces will nevertheless be recognized without any further examination or test, and also the reason or cause why such metal strip was sorted out from sheet metal pieces devoid of any defects.

According to another embodiment of the invention the arrangement may further be made that in addition to automatically released marking means, at least one marking device is provided which is hand-operated. Thus, sheet metal pieces may be indicated which have defects detected by an operator only, if such latter sheet metal pieces or strips were previously not subjected to any testing device.

According to another object the invention resides in the provision of means affording effective markings of faulty sheet metal strips automatically and in accordance with selected colors, thus making readily perceivable various categories of defects which are identified by a particular color label.

Still a further object of the invention is to provide means facilitating the supply of paper strips to any faulty sheet metal strips and their ready removal from the latter after the marking or markings by said paper strips have fulfilled their purpose.

Further characteristics and objects of the invention will ensue from the following description thereof in conjunction with the attached claims and drawings in which:

Fig. 1 shows schematically one of many possible embodiments of the invention as incorporated in a metal strip cutting plant.

Figs. 2, 3 and 4 show schematically in different positions of operation embodiment of marking means as employed in connection with the embodiment of the invention of Fig. 1.

Referring now more particularly to the drawings, Fig. 1 shows a plant embodying the invention and indicates schematically a strip severing or cutting plant. There is further shown a supply roll 1 supported on carrier 2, which supply roll contains a length, e.g. several hundred meters, of metal strip. This metal strip or band 3 is guided from the supply roll 1 via a straightening device 4 to a testing instrument 5 which in the embodiment shown tests the thickness of the metal strip. This strip, after it passes through the tester 5 is guided to the shearing or cutting device 6 which severs the band into a plurality of sectional strips 7 of predetermined length. Thereafter the strips 7 are moved on a transporting band 8 to marking devices 9, 10 and 11 which mark or indicate faulty strips 7 by means of a gummed paper strip or label 12. These strips are further moved to a device 13 which is responsive to such paper strip markings 12 and which initiates the sorting out of the marked strips by means of a guiding device 14. In the embodiment shown, the marked metal strips are lifted magnetically by means of a conventional sorting or grading device and deposited onto a transporting band 15 while the metal strips devoid of any markings drop onto a transporting band 16. The sheet metal strips moved on transporting bands 15 and 16 are then further conveyed to respective means for stacking the strips.

The testing device 5 for the thickness contains two elements 17 and 18. Element 17 is responsive to the thickness of the respective strip metal which happens to be greater than the measurement of thickness adjusted by the thickness testing device while element 18 responds to passing band strips which are thinner than the required measurement of thickness.

Elements 17 and 18 transmit control impulses in a detailed manner over conduits 19 and 21, respectively, to a magnet 20 in the marking device 10 or respectively to the magnet 22 of the marking device 11, so that the marking devices 10 or 11 will be released at the very moment in which the defective strip of unsatisfactory thickness passes through the appropriate marking device. Each of the marking devices 9, 10 and 11 contains a supply roll 24 of a gummed paper tape or strip for use as the marking labels.

In each of the marking devices 10 and 11 the respective supply roll 24 is mounted on a shaft 23. A driven roll 25 is fixedly connected to a pinion 26 which meshes with a toothed wheel 27, which latter is driven by a gear 29 mounted on shaft 28. On shaft 28 there is further fixed a ratchet wheel 30 having ratchet teeth 30a which cooperate with a pawl 32 linked to a lever 31. Lever 31 is pivoted on an arm 34 of a two-armed lever arrangement 34—35 which is swingably supported on a pivot axle 33. Arm 35 of the two-armed lever 34—35 is linked to a connecting rod 36 which is operatively connected to and movable by the action of a magnet 20 or 22 in response to excitation of said magnet. On lever arm 34 an upper cutting blade 37 of a cutting device is operatively fixed. A lower cutting blade 38 is stationary. At the end of the lever arm 34 there is attached a rubber pressing device 39 which is swingably supported about axle or pin 40. A biased spring 41 urges the pressing device 39 into the position indicated in Figs. 2 and 3. The upper cutting blade 37 may also be arranged directly on the rubber or yieldable pressing device 39 and may be swingable together with the latter about pivot pin 40.

In operation, when the thickness tester 5 sends a current impulse to the respective magnet 20 or 22 through element 17 or 18, which may be, for instance, a photoelectric cell or similar element responsive to defects in the material, then a drive mechanism comprising lever 34—35 will be swung about pivot or fulcrum 33, so that pawl 32 engaging with a tooth 30a, moves ratchet wheel 30 in the direction of arrow A. The translation of the gears 29, 27 and 26 is so chosen that drive roll 25 rotates a sufficient amount in order to draw from supply roll 24 about 4 centimeter of a tape or band 42 which is guided between said roll 25 and presser roll 44 and advanced between knives or cutting blades 37 and 38. Knife blade 37 is pivoted with arm 34 and in moving cuts a paper tape or strip, label or sticker 12 from the band 42 (Fig. 4) which paper strip 12 is then pressed downwardly by the rubber pressing device 39, the operation being so coordinated that the pressing is effected at that instant when the faulty metal strip 7 passes the respective marking device. The paper strip 12 is not gummed along its entire underface, but is only gummed along a portion thereof, so that the marking strip may be readily removed later on without leaving any traces on the surface of the metal strip. As soon as electric current ceases to flow through the respective magnet 20 or 22, then the respective marking device reverts to its starting position as shown in Fig. 2, under the action of spring 41.

In the embodiment shown, the marking device 9 is not actuated automatically through the tester 5, but by an operator who inspects the surface of passing metal strips 7 for defects. At the moment when a metal strip with an objectionable surface passes the marker 45 (Fig. 1) the operator actuates a lever 46, whereby an operation is initiated which is suitably delayed by any known time-delay mechanism so that the marking device 9 is released precisely when the faulty metal strip passes therebeneath. The respective gummed paper strip of the marking device 9 is applied to a location of the metal strip other than those where the gummed strips are applied by the marking devices 10 and 11, for instance, laterally or longitudinally displaced with respect to the points of application of gummed strips or labels by the marking devices 10 and 11.

For actuating the marking device 9, the electromagnet 20 or 22 may be omitted, if desired, and the lever 46 may be directly attached to connecting rod 36 in the interest of simplification.

The gummed strips dispensed by each of the marking devices are preferably different from each other in addition to merely being applied in a different position on the metal strip. A particularly satisfactory arrangement involves the use of gummed and differently colored strips, e.g., green for excessive thickness, red for insufficient thickness, and yellow for faulty surfaces.

The sorting or grading device 13, 14 may be made responsive to the positioning of the several indicia or to changes in the reflection of the surface of the metal strips due to the differently colored indicia.

The sorting device therefore is provided with optical means of known construction for indicating the presence of unmarked strips as opposed to those which are marked, and further with means responsive to the indications of the optical means for separating the marked strips from those which are unmarked. If desired, additional transporting bands may be employed so that each different type of defective strip may be separately transported and sorted.

Alternatively, the testers for the thickness or any other characteristics may be disposed beyond the cutting device 6. In such case, the thickness of the metal strip may then be measured without being touched as, for instance, by the extent of penetration of radio-active rays which is dependent upon the thickness of the metal.

The arrangement according to the invention is not only directed to the employment thereof for sorting or grading individual sheet metal strips, but this arrangement may also be used for sorting of other specimens or work pieces which may differ with respect to other characteristics such as, for instance, the width of the specimen.

Various changes and modifications may be made without departing from the spirit and scope of the present invention and it is intended that such obvious changes and modifications may be embraced by the annexed claims.

Having thus described the invention, and what is claimed as new and desired to be secured by Letters Patent, is:

1. In a plant for marking selected sectional strips cut from a continuous band of material, whereby said strips differ from a selected reference characteristic, said plant having means for supplying said band of said material along a predetermined path, testing means selectively actuated upon passage of said band when differing in at least one characteristic from said selected reference characteristic and cutting means disposed along said path and positioned at a location beyond said testing means for cutting said band into successive sectional strips; a plurality of marking devices disposed successively along said path and at a location beyond said band cutting means, one of said marking devices being manually operable, the other of said marking devices including each electromagnetic means operatively connected with said testing means, respectively, a supply roll of gummed paper located in each of said marking devices and arranged for operation by the testing means, a drive mechanism for each supply roll of gummed paper for said other marking devices and including a ratchet and gear assembly, fulcrumed lever means including a pair of arms pivotally connected to said lever means, respectively, one of said arms being connected to said electromagnetic means of the respective other marking devices, the other of said arms terminating in pawl means operatively connected to said ratchet and gear assembly for feeding gummed paper from the respective roll onto said strips, knife blade means positioned on said lever means beyond said pair of arms, a fixed knife blade arranged adjacent said knife blade means for cooperation therewith, said electromagnetic means being operable by said testing means, respectively, and in timed relation therewith, thereby to activate one of the other marking devices and to sever by said knife blade means and said fixed knife blade from the respectively supply roll of gummed paper a label for application to the respective strip, and means in operative relation to said lever means for applying a paper label to a sectional strip selected upon manual operation of said one marking device, each of said rolls of said other marking devices carrying different colored papers, whereby the identity of the different characteristic of a selected sectional strip may be determined by inspection of the respective color of the paper applied to said sectional strip.

2. In a plant for sorting sectional strips cut from a continuous band of material, whereby said srtips differ from a selected reference characteristic, said plant having means for supplying said band of said material along a predetermined path, testing means selectivly actuated upon passage of said band when differing in at least one characteristic from said selected reference characteristic and cutting means disposed along said path and positioned at a location beyond said testing means for cutting said band into successive sectional strips; a plurality of marking devices disposed successively along said path and at a location beyond said band cutting means, at least some of said marking devices including each electromagnetic means operatively connected with a respective testing means, a supply roll of gummed paper coordinated to each of said marking devices, means operatively connected to said electromagnetic means of said marking devices for cutting a respective gummed paper label from the corresponding supply roll and applying the respective gummed paper label onto a selected strip, the paper labels from the respective rolls of said marking devices being different in color, whereby the identity of the different characteristic of said selected sectional strip may be determined by inspection of the respective color of the paper label applied to said selected sectional strip, and means for deviating said successive sectional strips according to their colored labels in different directions for sorting said sectional strips.

3. An apparatus for use in connection with sorting of sectional strips differing from a selected reference characteristic; comprising a set of marking devices arranged next to each other and along a predetermined path, each marking device including electromagnetic means, a roll of marking paper of predetermined color corersponding to a respective deviation from said selected reference characteristic, feed and cutting means operable by said electromagnetic means, respectively, for cutting a piece of marking paper from the respective paper roll and applying said piece to said sectional strips, respectively, thereby to visually and permanently indicate the respective reference characteristic on said sectional strips, means for deviating from said path said successive sectional strips marked by said marking devices, respectively, in a direction according to the respective color of said pieces of marking paper applied to said strips, and means for conveying said sectional strips from said feed and cutting means to said deviating means.

4. An apparatus for use in connection with sorting of sectional strips made of metal and similar material and differing from a selected reference characteristic, whereby said sectional strips are successively transported along a predetermined path past testing means; comprising a set of marking devices arranged next to each other and along said path, each marking device including electromagnetic means operatively connected to a respective testing means, a roll of marking paper of predetermined color corresponding to a respective deflection from said selected reference characteristic, means for advancing marking paper from the resepctive roll and operable via said testing means by said electromagnetic means, respectively, cutting and applying means responsive to said electromagnetic means and adjacent said feed means for receiving marking paper therefrom for cutting pieces of marking paper from the respective paper roll and applying said pieces to said sectional strips, respectively, thereby to visually and permanently indicate for inspection by the operator the respective reference characteristic sensed by the respective testing means, means for deviating from said path respective sectional strips marked by said marking devices in a direction according to the respective color of said pieces of marking paper applied to a strip, and means conveying said sectional strips from said cutting and applying means to said deviating means.

UNITED STATES PATENTS

References Cited in the file of this patent

| | | |
|---|---|---|
| 627,496 | Gilsdorf | June 27, 1899 |
| 1,073,515 | Peters | Sept. 16, 1913 |
| 2,306,211 | Geiss | Dec. 22, 1942 |
| 2,312,357 | Odquist | Mar. 2, 1943 |
| 2,312,626 | Chamberlin | Mar. 2, 1943 |
| 2,482,711 | Jensen | Sept. 30, 1949 |
| 2,536,693 | Okolicsanyi | Jan. 2, 1951 |
| 2,563,213 | Coleman | Aug. 7, 1951 |
| 2,657,799 | Johnson | Nov. 3, 1953 |
| 2,695,098 | Rendell | Nov. 23, 1954 |
| 2,721,669 | Keely | Oct. 25, 1955 |
| 2,730,233 | Coleman et al. | Jan. 10, 1956 |
| 2,884,130 | Bosch | Apr. 28, 1959 |
| 2,904,174 | Emerson | Sept. 15, 1959 |